Aug. 8, 1961  D. T. MEISENHEIMER ET AL  2,994,971
INSTRUCTIONAL SKY SCANNER
Filed Jan. 28, 1959  4 Sheets-Sheet 1
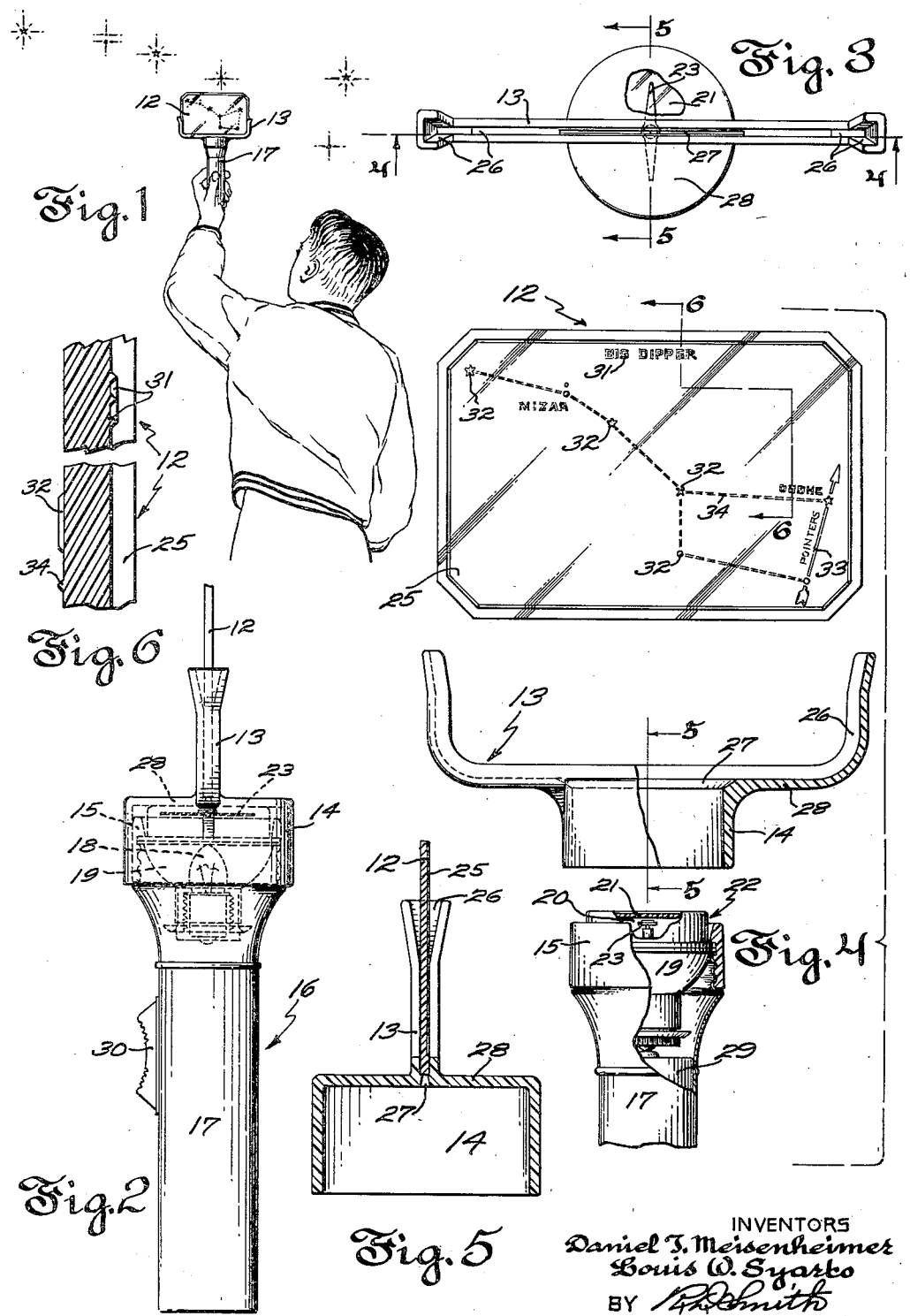
INVENTORS
Daniel T. Meisenheimer
Louis W. Syarto
BY  R.D. Smith
ATTORNEY Aug. 8, 1961  D. T. MEISENHEIMER ET AL  2,994,971
INSTRUCTIONAL SKY SCANNER
Filed Jan. 28, 1959  4 Sheets-Sheet 2
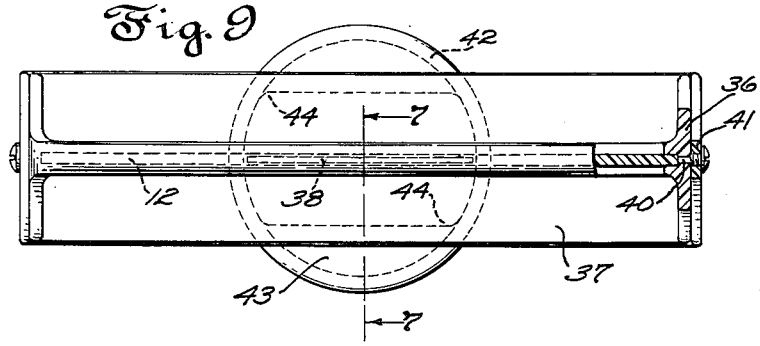
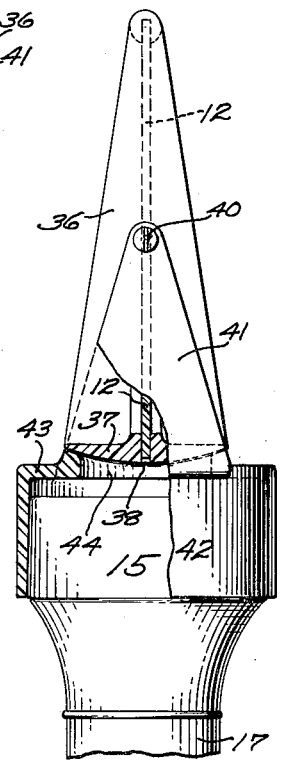
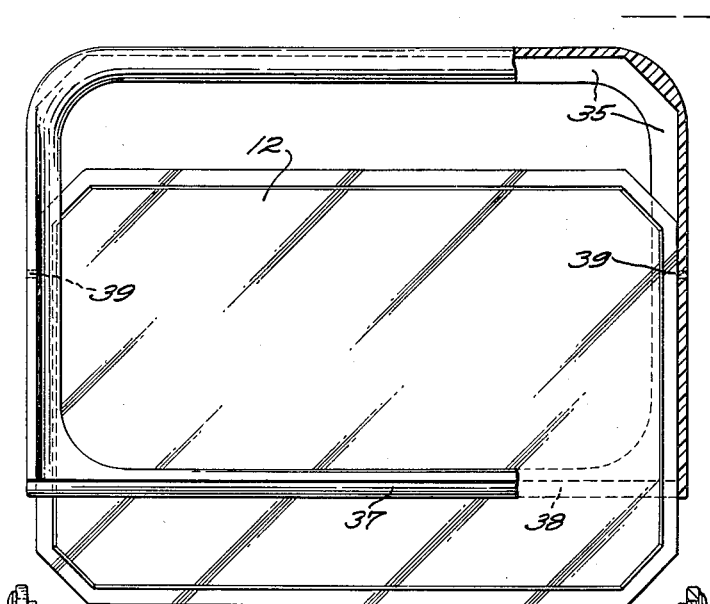
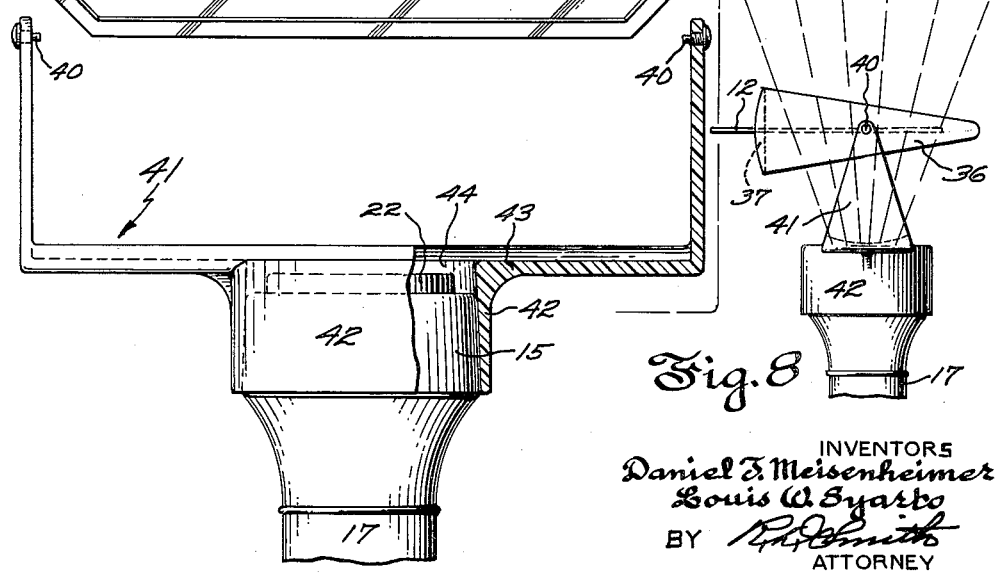
INVENTORS
Daniel T. Meisenheimer
Louis W. Syarto
BY
ATTORNEY

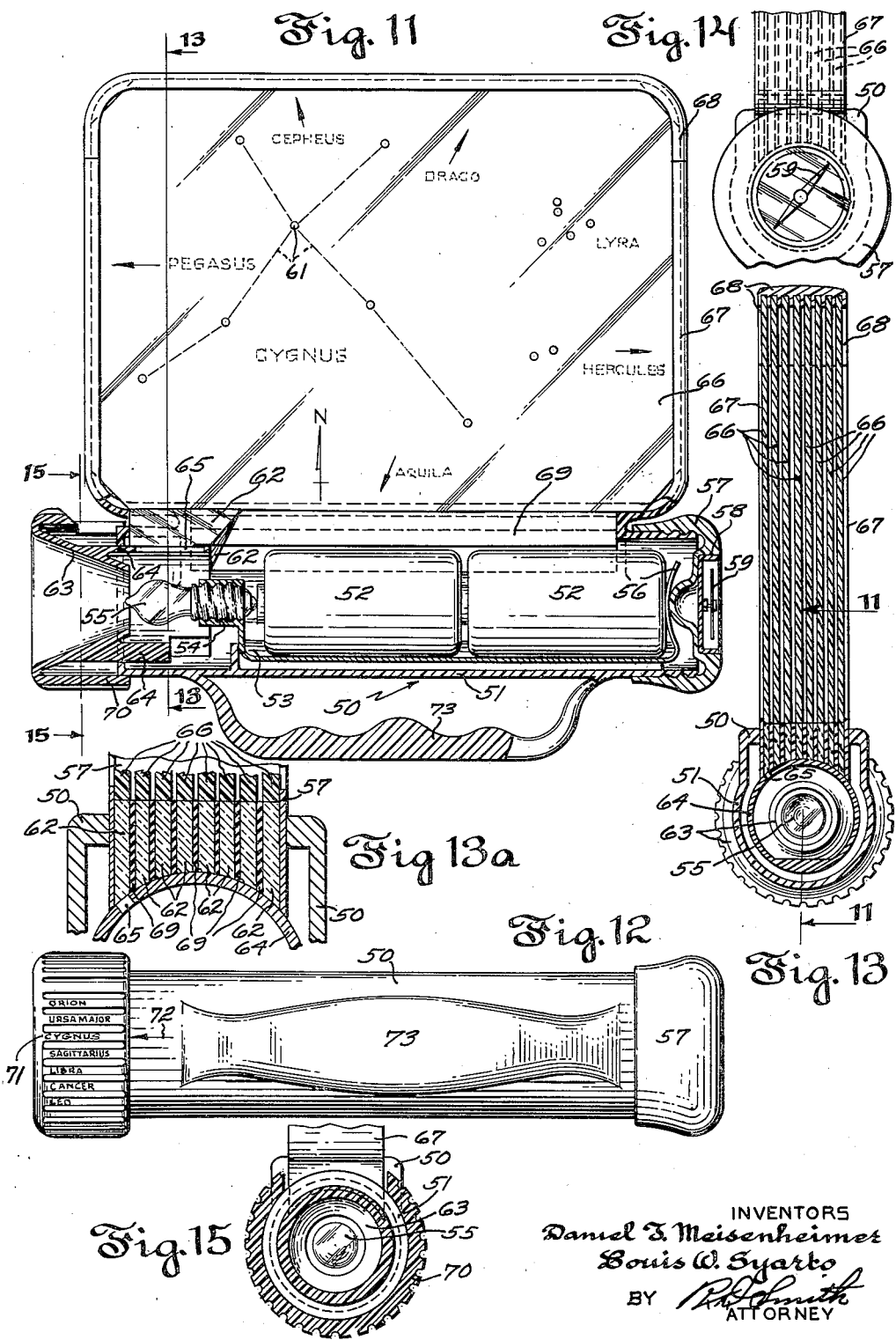

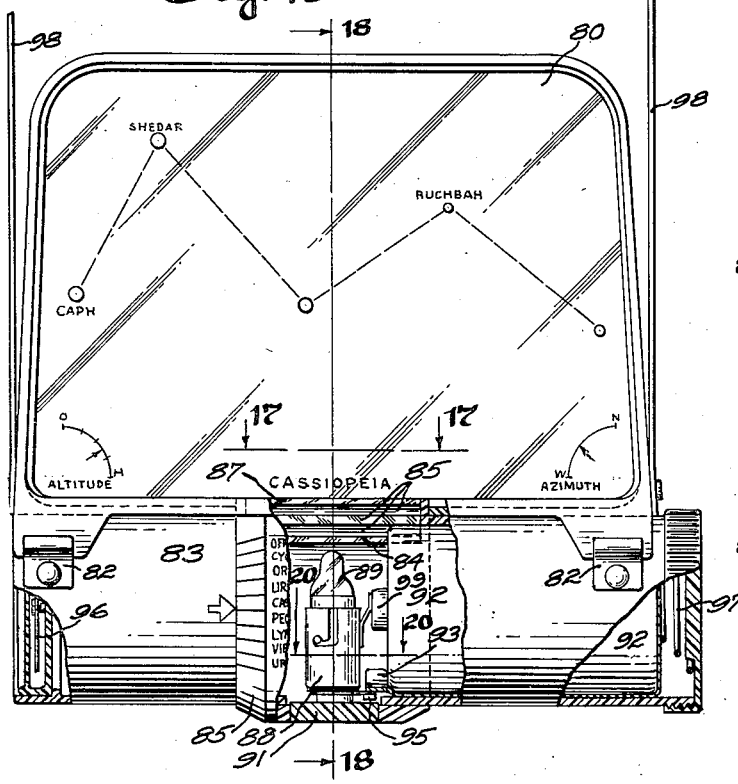
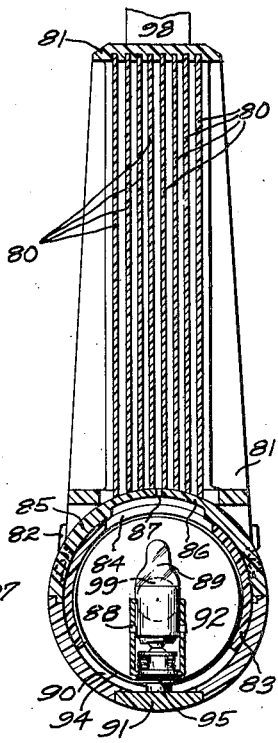
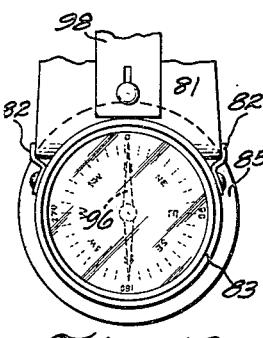
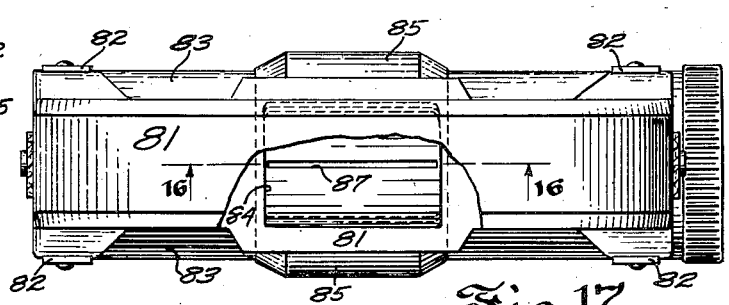
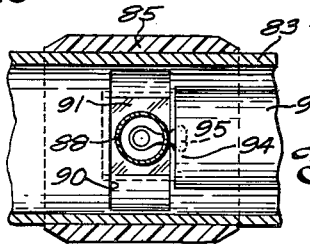

United States Patent Office 2,994,971
Patented Aug. 8, 1961

2,994,971
INSTRUCTIONAL SKY SCANNER
Daniel T. Meisenheimer, Milford, and Louis W. Syarto, Fairfield, Conn., assignors to The A. C. Gilbert Company, New Haven, Conn., a corporation of Maryland
Filed Jan. 28, 1959, Ser. No. 789,680
17 Claims. (Cl. 35—44)

This invention relates to an instructional sky scanner for viewing constellations of stars and planets at night in a manner to orient and identify the names of the natural celestial bodies while looking at them, as well as the position and courses of travel of various artificial satellites relative thereto.

An object of the invention is to provide means to this end which avoid the necessity of diverting one's gaze from the sky region that is under observation in order to consult opaque charts, diagrams, or the like, located apart from the line of vision when viewing the sky.

An important purpose of the invention is to scan the night sky through, and in comparison with, a transparent viewing plate or plates carrying diagram characters depicting the relationship of the observable celestial bodies by markings that are faintly visible on the plate.

A further object is to illuminate only the markings on the viewing plate by means of a source of light obscured from the eyes of the observer, thus leaving visible through the plate and unobscured by vagrant light the actual planets and stars in the sky which therefore may be viewed in concordance with the plate markings.

Another object of the invention is to construct a sky scanner of the aforesaid kind in small and lightweight portable form suitable for being carried about outdoors in the manner of a camera or binoculars, and maneuverable for viewing the sky while held in the hand.

Another object is to equip the scanner with an independent source of artificial illumination.

Another object is to provide a holder for interchangeable or stacked transparent viewing plates enabling the use of selected differing charts or diagrams representing different specific constellations or groupings of the celestial bodies.

Another object is to incorporate with such holder of a stack of plates means for illuminating the markings on only a selected one of the stacked plates at a time.

Another object is to incorporate in a holder for a single transparent viewing plate means for tilting it so that its broadside face is met by the rays of artificial light which thereby can shine through the plate and cause to be projected on a display screen or the like a magnified image of the plate markings.

Another object is to accomplish the aforesaid faint illumination of the characters on the transparent viewing plates by edge lighting the plates and where there is employed a plurality of such plates, stacked as in a file, by the edge lighting of only one of the stacked plates at a time while the other plates in the stack remain unlighted and fully transparent to be looked through simultaneously in scanning the sky.

Another object is to provide selectively operable light directing means for determining by choice which one of the stacked viewing plates shall alone be edge lighted.

Another object is to provide changeably settable means, preferably dimly illuminated, associated with the aforesaid light directing means so as to signal the identity of the diagram or chart on whatever viewing plate is being illuminated at a given time.

Another object is to render free from prelimitation the sequence or order in which the different chart plates shall selectively be illuminated.

A portable sky scanning device for the foregoing purposes can assume many alternative forms, four of which forms are disclosed in the following description, having reference to the appended drawings wherein:

FIG. 1 illustrates the intended use of an instructional sky scanner incorporating the invention wherein an observer holds it at approximately arm's length between his eyes and the night sky.

FIG. 2 is an elevation of a simple form of the scanner in suitable actual size.

FIG. 3 is a plan view looking at that portion of the scanner which interchangeably holds various viewing plates carrying different charts or diagram markings.

FIG. 4 shows in exploded relation, and with parts of their structure broken away on the plane 4—4 in FIG. 3, the sections of the scanner that are shown assembled in FIG. 2.

FIG. 5 is a view on an enlarged scale taken in section on the plane 5—5 in FIG. 3 showing the transparent viewing plate mounted in the holding rack.

FIG. 6 is a still further enlarged fragmentary view of the viewing plate taken in section on the plane 6—6 in FIG. 4.

FIG. 7 is a view similar to FIG. 2 showing a modified construction in which the transparent viewing plate is so mounted in its holder that it can be tilted in relation to the rays of artificial light.

FIG. 8 is a view on a reduced scale showing the transparent viewing plate tilted to a position for projecting an image of its diagram markings on a distant screen or display surface.

FIG. 9 is a plan view of the modified construction of FIG. 6.

FIG. 10 shows in exploded relation a plate holding frame, a viewing plate partially inserted therein and a pivot affording fork by which the plate and its frame are supported on the head of the flashlight.

FIG. 11 shows a different modification of the scanner in which plural transparent chart plates are stacked serially in file relationship for selective edge lighting, whereby to render the chart markings on a single one of different viewing plates visible at respectively different times.

FIG. 12 is a bottom plan view looking upward at FIG. 11.

FIG. 13 is a view taken in section on the plane 13—13, in FIG. 11 looking in the direction of the arrows.

FIG. 13a is a fragmentary view on a larger scale of parts in FIG. 13.

FIG. 14 is a view looking at the base end of the flashlight casing showing the directional compass thereat.

FIG. 15 is a view taken in section on the plane 15—15 in FIG. 11 looking in the direction of the arrows.

FIG. 16 is an elevation of a further modified form of the scanner in which the transparent viewing plates are illuminated at the center of their horizontal length, the scanner being equipped with straps by which to suspend it from the neck of a user like a camera.

FIG. 17 is a plan view of the scanner shown in FIG. 16 with its structure partially broken away on the plane 17—17 in FIG. 16 with the viewing slides omitted.

FIG. 18 is a view taken in section on the plane 18—18 in FIG. 16 looking in the direction of the arrows.

FIG. 19 is a fragmentary view looking from the left at the compass displaying end of the light chamber.

FIG. 20 is a view taken in section on the plane 20—20 in FIG. 16 showing the light control switch.

FIG. 1 shows an observer looking at the night sky through the improved sky scanner held at approximately arm's length. This is a simple form of the scanner comprising a transparent viewing plate 12 which may be molded of Lucite, a trademark designating a methyl methacrylate molding compound, and supported removably at its margins in a holding framework comprising a grooved U-shaped rack 13 that includes a hollow hub 14 by means of which the rack is fittingly and removably mounted on the head 15 of a flashlight 16. Handle 17 of the flashlight forms the handle of the scanner and its head 15 is screw-mounted on the handle 17 and retains as a source of light a battery powered flashlight lamp bulb 18 with its hollow reflector 19 in conventional manner. Thus the plate holding framework forms a shroud shielding the light of lamp bulb 18 from the eyes of the user. United with the reflector 19 there is an auxiliary chamber 20 carrying the glass cover or crystal 21 which protects a directional compass 22 confined within chamber 20 so that the compass needle 23 is silhouetted and thereby visible against the light that is emitted by bulb 18 and its reflector 19 when the rack 13 is removed from the head of the flashlight which otherwise shrouds the light.

The rack 13 is channeled at 26 to slidably receive and resiliently press sidewise inward against the margins of transparent plate 12 thereby to hold the latter firmly yet removably in the rack. To provide an outlet for light rays the opaque cross wall 28 of the hollow hub 14 of the rack contains a light directing aperture or port in the opacity of the cross wall comprising a narrow slot 27 no wider than the thickness of the viewing plate 12, and in strict register with said plate edge, this slot extending crosswise the end of hollow handle 17 and being the only opening in the cross wall 28 which elsewhere opaquely roofs over the hollow of the hub.

In conventional manner the hollow casing handle 17 of the flashlight is an elongate tubular structure containing one or more dry cells or batteries 29 electrically connected to energize the light bulb 18 when the sliding switch handle 30 is shifted electrically to connect or disconnect the light bulb from the battery. It is unnecessary to show the switch contacts which control the lamp circuit because they are well-known in a variety of forms in the art and are not of consequence to the form of the invention shown in FIGS. 1–10.

On the surface of the transparent viewing plate there are embossed or line printed, or molded from the substance of the plate certain markings 32, 33 of which an example appears in FIG. 4. The purpose of the invention would be served if such markings were etched or depressed in intaglio style, in the surface of plate 12 instead of made in bas-relief, their function being to intercept and deflect otherwise invisible light rays that are transmitted through the transparent material of the plate in directions paralleling the broad surfaces thereof. Material may be glass or methyl methacrylate or other suitable transparent plastic.

In the particular viewing plate shown in FIG. 4 the markings 32, 33 form a diagram depicting the relative positions of the celestial bodies in the constellation, Ursa Major, popularly known as the "Big Dipper," and are arranged in suitable size and proportional spacing to be concordant with the relative positions of the depicted stars as actually appearing in the sky. The scale of the markings on the viewing plate is such that the diagram of the constellation formed thereby will approximately match in size and position the actual appearance of the stars so as to be identified therewith without removing one's gaze from the constellation in the sky that is being observed. In other words, each individual star falling within the scope of the viewing plate can be identified readily with a corresponding mark 32 on the plate. The diagrammatic markings on the plate are supplemented by instructional characters and indicia which may display facts about the celestial bodies under observation such as their names, magnitudes, and direction indicating characteristics, the later being represented in the illustarted diagram by an arrow 33 extending through two of the stars included in the portrayal of the "Big Dipper" known as the "Pointers" pointing to the North Star. Dotted lines 34 connecting the various stars are markings which correspond with imaginary lines used graphically for grouping the stars that are regarded as belonging to a given constellation.

FIGS. 7–10 show a modified construction of the scanner wherein the viewing plate 12, instead of being seated directly in a stationary rack such as 13, is inserted edgewise into its margin receiving grooves 35 in a tiltable frame 36 which has a widened span 37 containing a slot 38 slidably fitted and filled by a margin of the viewing plate which is receivable by frame 36 through said slot. In FIG. 10 the viewing plate is shown as being removably inserted edgewise in the tiltable frame.

Frame 36 contains coaxial pivot bearing holes 39 engaged by retractable pivot studs 40 carried respectively in the upstanding arms of a yoke 41 whose hollow hub 42 mounts removably on the head 15 of a flashlight 16 as does the hub 14 of rack 13 in FIGS. 1–6. However, the cross wall 43 of hub 42 contains a spacious aperture 44 for passing substantially all the light from the bulb 18 outward of the flashlight although such aperture is fully covered and shrouded by the widened span 37 of tiltable frame 36 when swung to the position shown in FIG. 7 for edge lighting the viewing plate 12. To insure against leakage of light the bottom surface of frame 36 is convexly crowned and the top surface of the crotch of yoke 41 that borders aperture 44 is fittingly concave as shown in FIG. 7.

The form of the scanner shown in FIGS. 7–10 is used and operated like that of FIGS. 1–6 except that for indoor group study of constellations the viewing plate may be swung from the sky viewing position shown in FIG. 7 to the image projecting position shown in FIG. 8, whereby the unrestricted rays of light from the lamp in the flashlight are free to shine through aperture 44 and the broadside surfaces of the viewing plate and can thereby be cast upon a display screen whereupon the diagram marks 32, 33 and 34 appear as shadows in sharp contrast against an illuminated field thus enabling the plate diagram and all its markings to be observed and lectured upon for class purposes or for group study and discussion.

The surface of the viewing plate carrying the permanent diagram is such that temporary pencil or crayon lines may additionally be marked thereon and easily erased from the permanent diagram, whereby to indicate the charted course or position of some artificial satellite as aid to locating the same in the sky. Such additional markings will be in a medium which makes them, like the permanent diagram, illuminatable by edge lighting of the viewing plate and capable of casting a shadow in a shaft of light projected broadside through the plate onto the display screen.

The modified construction of sky scanner illustrated in FIGS 11–15 makes use of a flashlight type of hollow casing 50 having cylindrical walls 51 of insulative material enclosing a chamber for the storage of two batteries or dry cells 52 stacked in electrical series, as usual. The batteries are supported in an electrically conductive metallic holder 53 that is restrained from turning relatively to the casing wall 51 but is free to slide longitudinally of the casing. Battery holder 53 is provided at one end with a screw socket 54 receptive to a lamp bulb 55 whose center contact encounters the center terminal of the nearest battery. The opposite end of holder 53 is a flexible conductive spring leaf 56 that is capable of flexing into and out of circuit making contact with the base terminal of the nearest battery. Thus circuit through the lamp 55 can be made by screwing inward the insulative base cap 57 of the casing 50 which has threaded engagement therewith, this forcing the spring leaf 56 into circuit closing engagement with the base terminal of the battery from which the spring leaf is permitted to separate and break the lamp circuit when the base cap 57 is oppositely turned or unscrewed. For convenience of personal orientation the base cap 57 is shown to have a recess 58 in which is carried a directional compass 59.

At the opposite end of the flashlight casing 50 there is carried in swiveling and slidable relation thereto a rotatable ring comprising a conically shaped reflector member 63 having an inner barrel portion 64 at times surrounding the lamp bulb 55 inside of casing 50 and containing a narrow slot or light directing aperture 65 in the otherwise opaque barrel portion 64.

As shown in FIG. 13 slot 65 forms an aperture no wider than the thickness of a single one of the group of eight viewing plates 66 which individually may be similar to plate 12 in FIGS. 1-6. Aperture 65 is swingable into alignment with the bottom edges respectively of a series of light relaying elements each comprising a lamella 62 of transparent material whose bottom edge is stationed close to the periphery of the tubular casing structure and barrel 64 and whose top edge adjoins the bottom edge of a viewing plate 66 with which it accords in thickness. One of the plates 66 is shown to be marked in the manner of plate 12 with a diagram 61 representing the different constellation, "Cygnus." Others of the plates 66 may be marked with differing constellations.

Plates 66 are spaced from one another as shown in FIG. 13 and are held in parallel relation at their top and side margins by grooves in a bordering framework 67 that is fixed to the flashlight casing 50 and whose cover portion 68 bridges and is liftable from the upstanding sides of the framework to permit selective removal and replacement of any viewing plate or plates carrying diagrams of particular constellations or star arrangements.

The light relaying transparent lamellae 63 whose top edges adjoin and align with the bottom edges of the plates 66 are separated by opaque partitions 69 to prevent leakage of light from the aperture 65 to more than one of the viewing plates at a time. Lamellae 62 may be integral with the plate proper.

Reflector member 63 also has an outer ferrule portion 70 which has both rotary and a slide bearing on the adjacent cylindrical end of the flashlight casing and its periphery may be marked as shown at 71 in FIG. 12 with the names of the constellations that are carried respectively by each viewing plate. Its markings 71 are turned into register with an index mark 72 on the flashlight casing to indicate the name of the constellation on the viewing plate 66 with which the light aperture 65 aligns. If the reflector member 63 be made of translucent plastic the markings on ferrule 70 will be visible because of glowing in the dark as is likewise true of the index mark 72 if it constitutes an aperture or window in the casing wall 51. Markings 71 may be carried by a translucent removable shell which caps removably over the ferrule portion 70 and can be exposed to light from lamp 55 by respectively underlying slots in the rim of the ferrule portion.

In use of the device merely as a flashlight, as for finding one's way in the dark or for reading instructional matter, the reflector member 63 in unison with its ferrule portion 70 and barrel portion 64 can be slid toward the right in FIG. 11 to place the conical light reflecting surface of member 63 in surrounding relation to the lamp bulb 55 whereupon the reflector will perform its usual light beaming function as in an ordinary flashlight.

The flashlight casing 50 may be equipped with a loop handle 73 by which the sky scanner of FIGS. 11-15 can be carried and wielded for its several purposes of projecting a light beam, telling direction by compass or locating and identifying stars and other celestial bodies in the night sky. The sky can be clearly viewed through the entire stack of transparent viewing plates shown in FIG. 13 as readily as through the single viewing plate of FIG. 1-10 because only the diagram markings, and not the flat background surface of any viewing plate, emits light.

In FIG. 16 a similar group of transparent viewing plates 80 is shown wherein the plates are held in spaced relationship by a common upstanding framework 81 which seats firmly and removably in clips 82 on the outer surface of a modified form of flashlight casing 83. Midway its length, light shrouding casing 83 has a window opening or light releasing aperture 84 as wide in circumferential extent as the overall thickness of the whole group of viewing plates 80. This window opening and the margins of the casing walls which border it are encompassed by a ring or blind 85 comprising an opaque shell that swivels thereabout like a ferrule, said ring having an opaque segment thinned in its portion 86 which contains a very narrow light directing aperture 87 comparable to the slot-like aperture 65 in FIG. 11 and likewise no wider than the thickness of an individual one of the viewing plates 80. Elsewhere ring 85 may be translucent so that the names of constellations marked on its periphery or on a transparent label or replaceable covering shell that clings thereto will be visible in the dark.

In diametrical alignment with window 84 and aperture 87, ring 85 carries internally thereof and surrounds a socket 88 receptive to a bayonet-base type of miniature lamp bulb 89 which thereby swings in unison with the turning movement of ring 85. Space is provided for the lamp socket 88 to thus swing by a segmental cutout 90 in the wall of flashlight casing 83 enabling the socket to be mounted removably on an insulative insert 91 lodged removably in the wall of ring 85 so that burned-out lamps may be replaced.

Lamp socket 88 is in permanent electrical contact with the positive pole 99 of a battery or dry cell 92 whose opposite or base pole end is in permanent electrical contact with a bus bar 93 that is constrained against turning but is freely slidable lengthwise of casing 83. The battery and its bus bar are constantly urged toward the left in FIG. 16 by the usual resilient coil spring 97. Bus bar 93 terminates in an arcuately curved stationary segmental conductive switch track 94 which is wiped by a conductive brush 95 fixed mechanically on socket 88 in insulated relation thereto but so as to travel in unison therewith. Brush 95 is constantly in contact with the center terminal of the lamp base as shown in FIG. 18 so that current is constantly supplied to the lamp while the ring 85 is turned relative to casing 83 for placing light aperture 87 in illuminating register with the edge of any selected viewing plate 80. The lamp can be extinguished by turning ring 85 to a position wherein brush 95 departs from track 94.

In FIG. 16 it is observed that the whole of the interior of the flashlight casing 83 is illuminated so that a directional compass 96 carried in the left end of the casing will be visible and readable at night if the compass pointer is encased by transparent material.

The sky scanner of FIG. 16 may conveniently be equipped with carrying straps 98 by which it can be slung from the shoulder or neck of the user in the usual manner of portable instruments for use in the field.

In the illuminating feature of all forms of the invention herein pictured and described it may be found useful to color the rays of light that are directed against the edges of the viewing plates in order to dull their brightness while leaving the source of light at full brilliancy for use as a flash-light. This can be done by interposing a color filter such as red, blue, green, etc. between the lamp and any of the light emitting apertures 27, 38, 65 or 87 through which the viewing plates are edge lighted. If desired such filter may be attached to the inner surface of the structure which borders the light aperture in a manner to bridge the aperture.

Various other modifications of the particular embodiment of the invention disclosed herein may be introduced within the scope of the invention and all such are intended to be covered by the language of one or more of the following claims.

What is claimed is:

1. An instructional sky scanner for aid in locating and identifying celestial bodies by viewing them in the night sky through a transparent diagram, said scanner comprising at least one transparent viewing plate adapted to be held before the night sky within arm's length of the eyes of the observer, markings on said plate forming a diagram depicting the relative positions of natural celestial bodies in suitable size and proportional relationship to appear approximately concordant with said relative positions of said bodies when viewed through said plate, said markings displaying information about said bodies and being disposed on said plate to intercept and refract rays of light conducted through the transparent material of said plate parallelly with the broadside surfaces thereof whereby said markings are caused to glow in the dark; manually graspable plate holding framework constructed supportingly to engage at least one margin of the plate, a source of artificial light rays carried by said framework, an opaque shroud carried by said framework disposed to cut off said rays from the sight of the observer, and a light transmitting port in the opacity of said shroud located between said light source and the edge portion of said plate, said port being of a shape and size to confine said rays of light to said edge portion.

2. An instructional sky scanner as defined in claim 1 in which the said shroud includes a hollow casing enclosing the said source of light, and the said light transmitting port comprises a light directing aperture in said shroud interposed between said source of light and the said edge portion of the said transparent viewing plate.

3. An instructional sky scaner as defined in claim 2, in which the said source of light includes an electric lamp bulb, together with an electric storage battery within said casing connected to energize said lamp bulb.

4. An instructional sky scanner as defined in claim 2, in which the said casing is an elongate tubular structure, and the said light directing aperture and the said edge portion of the viewing plate are closely adjacent and elongated crosswise one end of said structure.

5. An instructional sky scanner as defined in claim 4, in which the said plate holding framework is removably mounted on and adjacent to the said end of the said elongate casing structure.

6. An instructional sky scanner as defined in claim 2, in which the said casing is an elongate structure having a tubular wall, and the said light transmitting aperture and the said edge portion of the said viewing plate are closely adjacent and elongated lengthwise said tubular wall of said structure.

7. An instructional sky scanner as defined in claim 6, in which the said plate holding framework is removably mounted on and adjacent to the said tubular wall of the said elongate structure.

8. An instructional sky scanner as defined in claim 6, together with a ring rotatable about the axis of the said elongate structure and about the said source a light and containing the said light directing aperture in position to be shifted crosswise the said edge portion of the said viewing plate by rotation of said ring and in a path intervening between said edge portion and said source of light.

9. An instructional sky scanner as defined in claim 8, in which the said ring has a portion of translucent materail carrying indicia illuminable through said material by light from the said source and informative of the plate lighting position of the said light directing aperture.

10. An instruction sky scanner as defined in claim 1 in which the said framework includes a member in which the said viewing plate is fixedly and removably held, and a yoke in which said member is pivotally mounted to tilt upon an axis adapted to shift the said plate margin toward and away from the said source of light, whereby the said rays of light can project an image of the said diagram through a broadside surface of said plate.

11. An instructional sky scanner as defined in claim 10, in which the said pivotally mounted member contains the said light transmitting port positioned to expose only an edge portion of the said plate to rays of light from the said source.

12. An instructional sky scanner as defined in claim 11, in which the said light transmitting port comprises a light directing slot in the said tiltable member fitted and filled by a margin of the said viewing plate.

13. An instructional sky scanner as defined in claim 12 in which the said light directing slot is large enough to permit the said viewing plate to enter and be withdrawn from the said tiltable member edgewise therethrough.

14. An instructional sky scanner as defined in claim 1 together with additional sky viewing plates mounted in face-to-face spaced apart relation in the said framework.

15. An instructional sky scanner as defined in claim 14, in which the said shroud comprises a movable blind containing a light directing aperture shiftable with movement of said blind from the edge of one of the said viewing plates to the edge of a different one of said plates.

16. An instructional sky scanner as defined in claim 15, in which the said source of light comprises an electric lamp bulb, and the said blind comprises an opaque shell surrounding said lamp bulb.

17. An instructional sky scanner as defined in claim 15, in which the said source of light comprises an electric lamp bulb, and the said blind comprises a mainly opaque shell carrying and surrounding said lamp bulb.

References Cited in the file of this patent

UNITED STATES PATENTS

| | | |
|---|---|---|
| 2,032,829 | Bartky | Mar. 3, 1936 |
| 2,297,851 | Wyss | Oct. 6, 1942 |
| 2,333,492 | Ridge | Nov. 2, 1943 |
| 2,460,346 | Hagner | Feb. 1, 1949 |
| 2,527,189 | Kittelson | Oct. 24, 1950 |
| 2,760,185 | Held | Aug. 21, 1956 |
| 2,810,821 | Cohn | Oct. 22, 1957 |

FOREIGN PATENTS

| | | |
|---|---|---|
| 203,478 | Great Britain | Sept. 13, 1923 |